(12) United States Patent
Yamaguchi (10) Patent No.: US 6,595,672 B2
(45) Date of Patent: Jul. 22, 2003

(54) VEHICLE HEADLIGHT DISCHARGE LAMP

(75) Inventor: Hironao Yamaguchi, Gamagori (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/151,236

(22) Filed: May 21, 2002

(65) Prior Publication Data

US 2002/0181247 A1 Dec. 5, 2002

(30) Foreign Application Priority Data

May 29, 2001 (JP) ........................................ 2001-161094

(51) Int. Cl.[7] .................................................. B60Q 1/00
(52) U.S. Cl. ...................... 362/547; 362/264; 362/294; 362/373
(58) Field of Search ................................ 362/538, 539, 362/547, 294, 373, 264, 265

(56) References Cited

U.S. PATENT DOCUMENTS 5,865,531 A 2/1999 Frey et al. .................. 362/373

6,164,806 A * 12/2000 Schmickl et al. ........... 362/547

FOREIGN PATENT DOCUMENTS

| JP | A-10-228804 | 8/1998 |
|---|---|---|
| JP | A-2000-235809 | 8/2000 |

* cited by examiner

*Primary Examiner*—Stephen Husar
(74) *Attorney, Agent, or Firm*—Posz & Bethards, PLC

(57) ABSTRACT

A vehicle headlamp housing is naturally ventilated by a temperature difference between air inside and air outside the lamp housing, to prevent the temperature of a lighting control circuit from increasing and to reduce thermal loads applied to circuit elements. The lamp housing includes a first opening lower than, and a second opening higher than the lighting control circuit. The first opening permits air access to a space, where the lighting control circuit is contained. The second opening also permits air access to the space. The lamp housing may be constructed so that space is naturally ventilated by the first and second openings. Additionally, a labyrinth arrangement or a filter arrangement can be used to govern the flow of air into the vehicle headlamp while excluding debris.

13 Claims, 6 Drawing Sheets

VEHICLE HEADLIGHT DISCHARGE LAMP

CROSS REFERENCE TO RELATED APPLICATION

This application is based upon, and claims the benefit of priority of prior Japanese patent Application 2001-161094, filed on May 29, 2001, the contents of which are incorporated herein by reference.

BACKGROUND OF THE INVENTION

1. Field of the Invention

The present invention relates to a vehicle headlamp using a discharge lamp and a controlled air flow through the headlamp to cool the discharge lamp and associated controls.

2. Description of Related Art

Generally, a discharge lamp has been used as a vehicle headlamp. The discharge lamp is an arc-discharge type electrical lamp. In the arc-discharge type lamp, xenon gas, or other appropriate gas, is enclosed in a discharge lamp bulb (arc tube), and light is emitted from the discharge lamp bulb using charge generated between a pair of electrodes therein. The light emitted from the discharge lamp bulb is white light similar to sun light. A quantity of light from the discharge lamp can be equal to or more than twice as much as that from a conventional halogen lamp while also using about 30% of the electrical power commonly used by a halogen lamp. Accordingly, when the discharge lamp is used as a vehicle headlamp, visibility forward of the lights is improved. That is, passengers will be able to see further in front of the vehicle compared to the use of halogen lights, with all other parameters being equal.

Generally, when the discharge lamp is turned on, a high voltage of several kilovolts (kV) to tens of kV is applied to the discharge lamp, thereby instantly beginning discharge therein, and lighting the light. Thereafter, electric power of about 35 watts (W) is applied thereto, thereby maintaining the lit condition. Therefore, a dedicated lighting-control circuit is required to light the discharge lamp. A lighting control circuit is mainly constructed of a converter, an inverter and an igniter. The converter increases direct-current (DC) voltage from a battery, and the inverter converts DC voltage to an alternating-current (AC) voltage. The igniter generates high voltage on the order of tens of kV.

In a vehicle, the lighting control circuit is generally mounted outside the lamp housing of a headlamp. In this case, wires, usually high voltage wires, and connectors, used for applying a high voltage to the discharge lamp, are required, thereby not reducing a size of the headlamp and its peripheral circuit. Further, many labor hours for attaching and wiring the high voltage wires and the connectors are required. Additionally, vehicle space for the wires and the connectors are required. Furthermore, high voltage wires require shielding for reducing adverse effects of electrical noises (electrical interference) from the wires, thereby increasing production costs of the headlamp and its peripheral circuit.

Therefore, it can be considered that the lighting control circuit should be mounted directly on the discharge lamp bulb in the lamp housing. For example, it is conceived that the discharge lamp bulb is connected directly to a connector contained in the lighting control circuit while the lighting control circuit is fixed to a rear surface of a reflector. According to this arrangement, no high voltage wires are required between the discharge lamp bulb and the lighting control circuit while the size of a vehicle headlamp can be reduced, thereby eliminating radio wave noises and power losses due to the high voltage wires.

While the discharge lamp bulb is lit, its temperature will increase and become high. Generally, ventilation holes are provided in the lamp housing to eliminate any pressure difference between the interior and the exterior of the lamp housing. However, each ventilation hole is set to a minimum area to prevent water and foreign matter from entering the lamp housing, so that almost no air stream or current is generated in the lamp housing. Therefore, while the discharge lamp bulb is lit, the air temperature in the lamp housing becomes high. That is, the temperature of the lighting control circuit becomes high by receiving heat from the discharge lamp bulb through thermal conduction, thermal radiation, and convection while the air temperature around the lighting control circuit becomes high. Thus, it is feared that excessive thermal loads are applied to circuit elements contained in the lighting control circuit. Although circuit elements and a circuit board, each having a high thermal resistance may be used as a remedy, production costs of the lighting control circuit and a size thereof increase with such requirements.

SUMMARY OF THE INVENTION

The present invention has been made in view of the above problems. Therefore, it is an object of the present invention to provide a vehicle headlamp to prevent the lighting control circuit temperature from increasing. That is, the lighting control circuit will be cooled by directing outside air into the lamp housing using the temperature difference of air between an interior and an exterior of the lamp housing. That is, mainly by using convection currents generated as a result of the temperature difference. Furthermore, it is an object to maintain cooling while preventing water droplets and debris from entering the lamp housing.

In embodiments of the present invention, the following technological means are adopted to attain the above object. In a vehicle headlamp according to the present invention, a lamp housing includes a first opening lower than a lighting control circuit and a second opening higher than the lighting control circuit. Further, the first and second openings are opened toward an internal space where the lighting control circuit is contained. The space is naturally ventilated using the first and second openings. Therefore, the lighting control circuit can be cooled using a natural stream of air, that is, natural convection currents of air generated by the air temperature difference between an interior and an exterior of the lamp housing while a discharge lamp bulb is lit. Accordingly, the lighting control circuit temperature can be prevented from increasing, and thermal loads applied to the circuit elements can be reduced. Furthermore, the addition of a ventilation unit such as an electric fan is not required, thereby preventing production costs from increasing.

Additionally, an inhibition member, for preventing water droplets and dust (debris) from entering the space, is provided for either or both of the first and second openings. The inhibition member may be a filter for trapping water droplets and dust. Alternatively, the inhibition member may be a labyrinth communicating with any one or both of the first and second openings. Therefore, water droplets and dust can be prevented from entering the lamp housing without increasing the number of components and production costs.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Hereinafter, the present invention will be described with reference to an embodiment shown in the drawings. In each drawing, the same components are indicated by the same reference numerals. The following description of the preferred embodiments is merely exemplary in nature and is in no way intended to limit the invention, its application, or uses.

Figure 1:
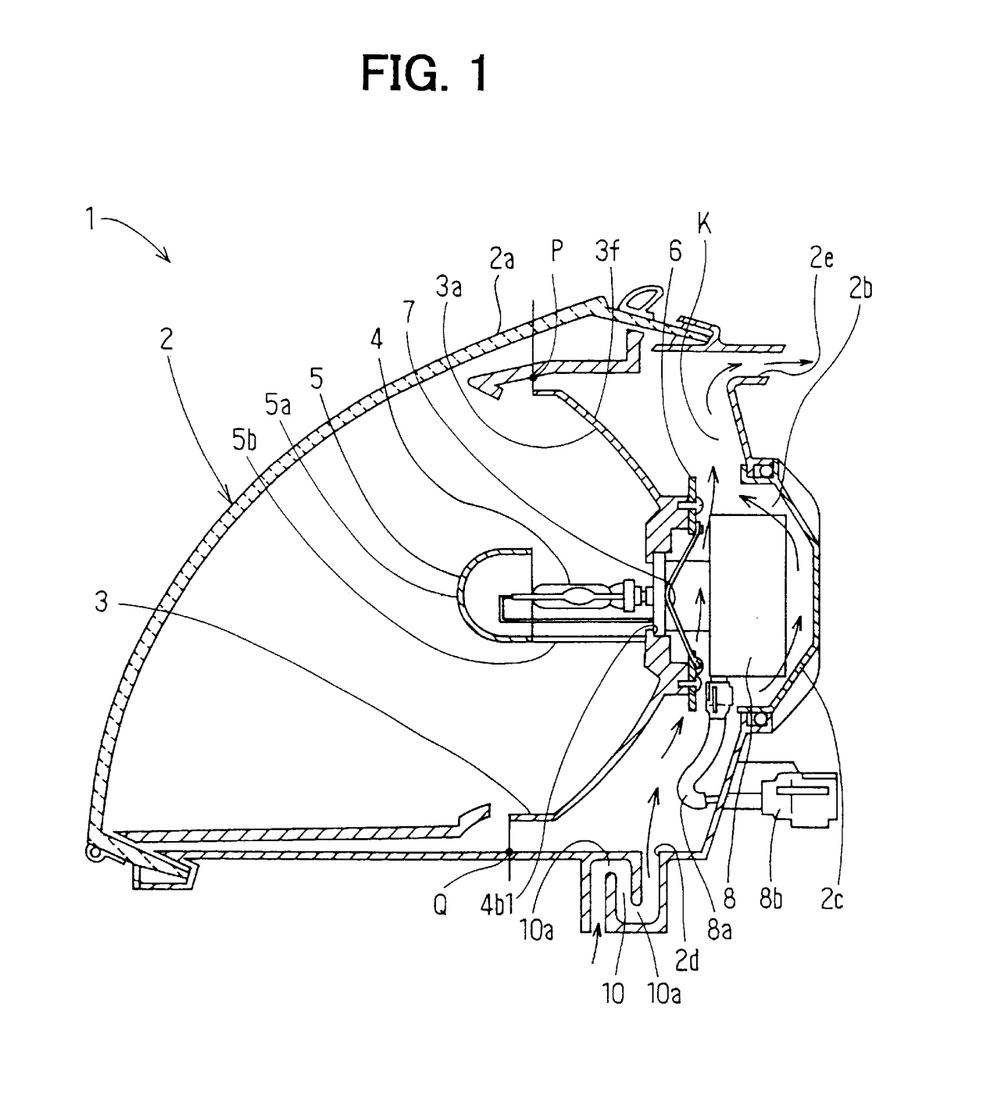
FIG. 1 is a cross-sectional view showing a vehicle headlamp according to a first embodiment of the present invention.
Figure 2:
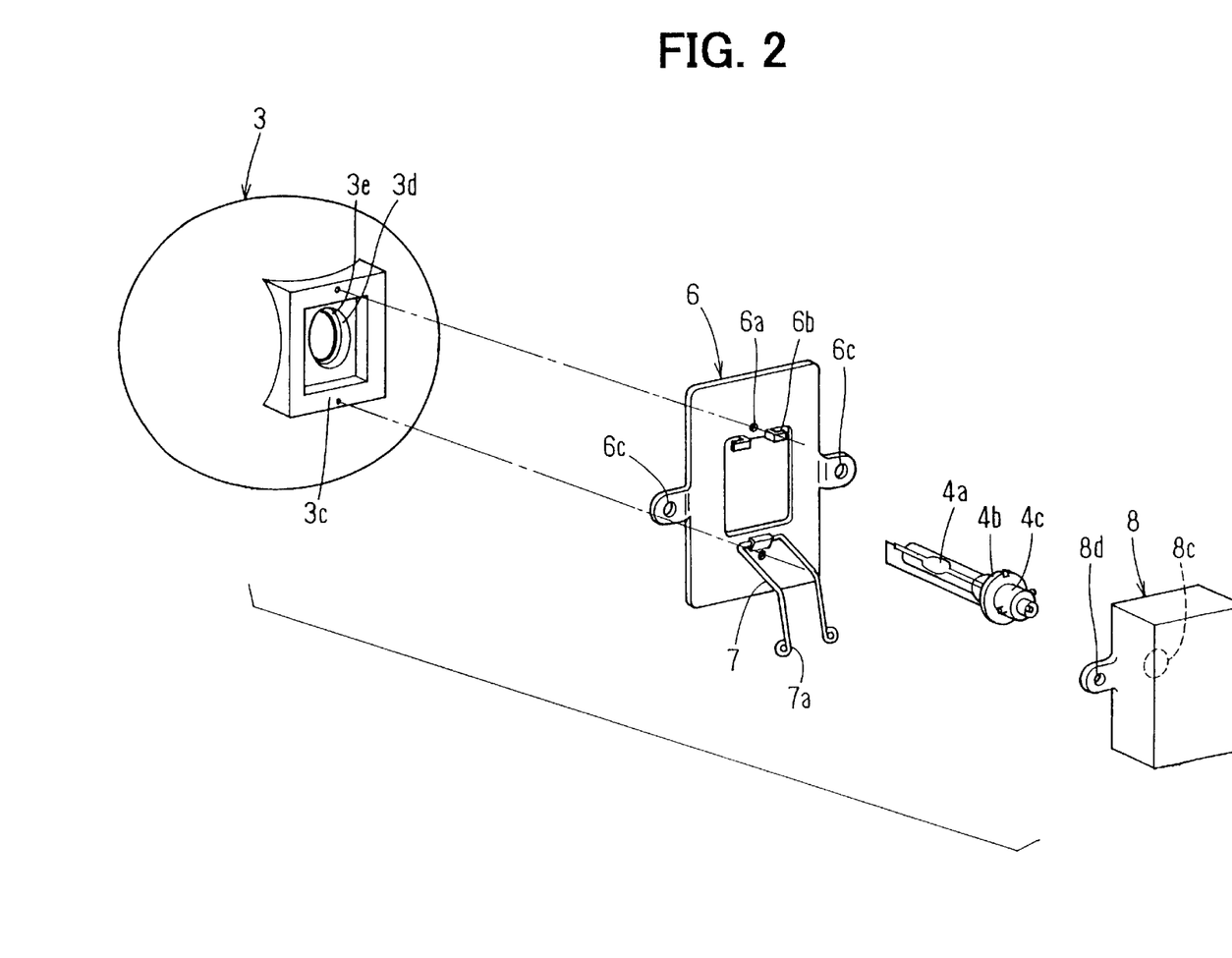
FIG. 2 is an exploded perspective view showing main components of the vehicle headlamp according to the present invention.

FIG. 1 is a cross-sectional view showing a vehicle headlamp 1 according to an embodiment of the present invention. In a condition where the vehicle headlamp 1 is mounted in a vehicle, the front of the vehicle is at the left side of FIG. 1 and the rear of the vehicle is at the right side of FIG. 1. The upper portion of the vehicle is toward the top of FIG. 1 and the lower portion of the vehicle is toward the bottom of FIG. 1. FIG. 2 is an exploded perspective view showing main components of the vehicle headlamp 1.

As shown in FIG. 1, the vehicle headlamp 1 includes a reflector 3, a discharge lamp bulb 4, a shade 5, a lighting control circuit 8 and a holder 6 in a lamp housing 2. A lens 2a is integrated to the lamp housing 2, and a reflecting mirror 3a is formed on a surface of the reflector 3 (on the same side as the discharge lamp bulb 4). The shade 5 shields a portion of light emitted from the discharge lamp bulb 4 to prevent the emitted light from being directly directed forward. Instead, the light is directed into the reflecting mirror 3a. The holder 6, attached to a rear surface 3f of the reflector 3, holds the lighting control circuit 8 and fixes it to the reflector 3. Here, the rear surface 3f is an opposite surface of the reflecting mirror 3a with respect to the reflector 3, and it does not involve the reflecting mirror 3a.

The lamp housing 2 is normally a molded resin body, and it integrally includes the transparent lens 2a at a vehicle front side as shown in FIG. 1. A space K is defined by the rear surface 3f of the reflector 3 and the lamp housing 2, and the lighting control circuit 8 is contained in the space K. In FIG. 1, a vertical line is drawn from each end of the rear surface 3f of each reflector 3 to the lamp housing 2. Upper and lower intersection points of the lines and the lamp housing 2 are indicated by reference letters P and Q, respectively. Specifically, the space K is defined by the reflector 3, the lamp housing 2, and a top side of the lighting control circuit 8 (at the right side in FIG. 1).

The lamp housing 2 includes a first opening 2d at a lower side in FIG. 1 and a second opening 2e at an upper side in FIG. 1. The first and second openings 2d, 2e fluidly communicate with the space K. In a condition where the vehicle headlamp 2 is mounted in a vehicle, the first opening 2d is disposed lower than the lighting control circuit 8, and the second opening 2e is disposed higher than the lighting control circuit 8. That is, the space K communicates with the exterior of the lamp housing 2 through the first and second openings 2d, 2e. Further, a labyrinth 10 is provided at an upstream side of the first opening 2d (outside the lamp housing 2) as an inhibiting member for inhibiting water droplets and dust from entering the lamp housing 2. The labyrinth 10 includes two U-shaped portions 10a. Air, entering into the labyrinth 10 from the outside of the lamp housing 2, is turned and directed 180 degrees in the U-shaped portion 10a. Then, water droplets and dust contained in the air are also turned with the air. The water droplets and the dust move to an outer circumferential portion of the U-shaped portion 10a due to inertia and centrifugal force experienced during the turning.

Thus, any water droplets and dust collide with a wall surface of the labyrinth 10 and adhere to the wall surface. Since the labyrinth 10 includes two U-shaped portions 10a, the water droplets and the dust, in two instances, may collide with an inner wall surface of the labyrinth 10 and adhere to it on at least two occasions. When the water droplets and dust adhere to an inner wall surface of the labyrinth, they are prohibited from entering into the lamp housing 2. Further, the lamp housing 2 includes an opening 2b at a position corresponding to the lighting control circuit 8. The opening 2b is used for attaching the holder 6 and the lighting control circuit 8 to the reflector 3 in the lamp housing 2. The opening 2b is hermetically sealed by a cover 2c. The discharge lamp bulb 4 can be replaced and the lighting control circuit 8 can be examined through the opening 2b even when the vehicle headlamp 1 is mounted in a vehicle.

Next, description will be made on functions of the first and second openings 2d, 2e. When the discharge lamp bulb 4 is lit, a temperature of air in the space K increases due to heat from the discharge lamp bulb 4. The temperature of space K becomes higher than the air temperature outside the lamp housing 2, and an air temperature difference exists between the space K and an area just outside the lamp housing 2. Accordingly, a specific weight difference of air is generated between the space K and the air exterior to the lamp housing 2. Specifically, a temperature of air is higher and a specific weight of air is smaller in the space K, but a temperature of air is lower and a specific weight of air is higher outside the lamp housing 2. The first opening 2d and second opening 2e are provided so that the space K fluidly communicates with the exterior of the lamp housing 2.

Therefore, natural convection currents of air are generated between interior space K and the area exterior to the lamp housing 2. Specifically, air, having a higher temperature and smaller specific weight in the space K, flows to the outside of the lamp housing 2 from the second opening 2e. Further, outside air, having a lower temperature and larger specific weight, flows into the space K from the first opening 2d.

This movement occurs even without movement of the vehicle due to specific weights and convection currents discussed above. The outside air, flowing into the space K, is heated by heat from the discharge lamp bulb 4 and the lighting control circuit 8 in the space K (i.e., cools air and the lighting control circuit 8 in the space K) while flowing upward around the lighting control circuit 8 as indicated by the arrows in FIG. 1. Then, the outside air flows outside the lamp housing 2 from the second opening 2e. That is, the outside air flows into the space K through the first and second openings 2d, 2e, thereby cooling the air in the space K or replacing the hot air caused by the discharge lamp bulb 4 with cool air. Therefore, the temperature of the lighting control circuit 8, disposed in the space K, is prevented from increasing, thereby reducing thermal loads applied to the circuit elements contained in the lighting control circuit 8. It is the lighting control circuit 8 and the circuit elements contained that energize the discharge lamp bulb 4.

Here, opening areas of the first opening 2d, second opening 2e, and a ventilation resistance of the labyrinth 10 are set so that air and the lighting control circuit 8 can be satisfactorily cooled in the space K. Specifically, they are set so that outside air can be sufficiently introduced into the space K using the natural convection of air generated by heat discharged from the lamp bulb 4. Further, it is desired that the temperature difference of air is large between around the first opening 2d and around the second opening 2e near the space K to effectively generate the natural convection. Also, the first opening 2d and second opening 2e are desired to be vertically disposed as far as possible from each other.

The discharge bulb 4 includes a light emitter 4a, a flange 4b to be held by the reflector 3, and a male connector 4c to be electrically connected to the lighting control circuit 8. The flange 4b and the connector 4c are located on the same side with respect to the light emitter 4a. The shade 5, for shielding a portion of light emitted from the discharge lamp bulb 4, is formed by a metal or heat resisting material. The shade 5 includes a bowl portion 5a, substantially hemispherically shaped, and a holding portion 5b. The bowl portion 5a is held at one end of the holding portion 5b, and the other end is fixed to the reflector 3. The bowl portion 5a is disposed so as to cover a front side of the discharge lamp bulb 4, and it shields light from being directly emitted from the discharge lamp bulb 4. Thus, the only light directed forward of a vehicle is the light reflected by the reflector 3, thereby obtaining a predetermined distribution pattern of light. Further, the bowl portion 5a prevents radio wave noises from radiating forward from the discharge lamp bulb 4.

The reflector 3 includes the reflecting mirror 3a, having a concave shape, at its front side and a holding portion 3d, for holding the discharge lamp bulb 4, at the reflector 3 center. The reflector 3 is formed by a metal material or by combining two or more materials such as metal materials and nonmetal materials such as resin materials, or other nonmetal materials. For example, the combination of a nonmetal material and a metal material is to deposit an aluminum film on a resin material. Here, the discharge lamp bulb 4 (specifically, the light emitter 4a) is required to be disposed at a predetermined position with respect to the reflecting mirror 3a so that the vehicle headlamp 1 can exhibit a predetermined light directing function.

The flange 4b of the discharge lamp bulb 4 is fitted in the holding portion 3d, and an end surface 4b1 of the flange 4b at a side of the light emitter 4a is made to contact a positioning stopper 3e, thereby accurately holding the discharge lamp bulb 4 at a predetermined position with respect to the reflecting mirror 3a. Thus, the reflector 3 is constructed so that a predetermined pattern of vehicle light distribution can be obtained by forwardly reflecting light emitted from the discharge lamp bulb 4 using the reflecting mirror 3a. Further, an attachment surface 3c, to which the holder 6 is attached, is provided on the reflector 3 at a rear side. The lighting control circuit 8 is attached to the holder 6. That is, the lighting control circuit 8 is attached to the reflector 3 at the rear side through the holder 6.

The lighting control circuit 8 is a lighting circuit for controlling lighting (energizing) of the discharge lamp bulb 4, and it includes an electrical circuit contained in a rectangular case. The electrical circuit is constructed by a converter, an inverter, an igniter and the like. The converter increases a direct-current (DC) voltage from a battery (not shown), and the inverter converts a DC voltage to an alternating-current (AC) voltage. The igniter is a starting circuit for generating the high voltage required for lighting the discharge lamp bulb 4. The electrical circuit controls electric power to light the discharge lamp bulb 4. The lighting control circuit 8 is attached to the holder 6, and the holder 6 is attached to the reflector 3 at the rear side. The lighting control circuit 8 contains a female connector 8c therein, and it is directly connected to the discharge lamp bulb 4 through the female connector 8c without lead wires. A lead wire 8a, having a connector 8b at its end, is brought out from the lighting control circuit 8. Electric power is supplied to the lighting control circuit 8 from the battery through the lead wire 8a. Further, the lighting control circuit 8 includes an attachment hole 8d used for attaching the lighting control circuit 8 to the holder 6.

Here, the lighting circuit, for controlling lighting of the discharge lamp bulb 4, is the lighting control circuit 8 including the converter, the inverter and the igniter. Otherwise, the lighting circuit is the igniter or a circuit at least including the igniter. The holder 6, for attaching the lighting control circuit 8 to the reflector 3, is formed by resin or metal. The holder 6 includes a hole 6a corresponding to the attachment surface 3c of the reflector 3, and it is attached to the attachment surface 3c using a screw through the hole 6a. Further, a spring 7, for pressing and fixing the discharge lamp bulb 4 to the reflector 3, is rotatably held by the holder 6. Latches 6b, for latching both ends 7a of the spring 7, are provided on the holder 6. Furthermore, the holder 6 includes a female screw hole 6c used for attaching the lighting control circuit 8 to the holder 6.

Next, a description of an assembling method of the vehicle headlamp 1 according to an embodiment of the present invention will be made. The reflector 3 attaches to the lamp housing 2, and the shade 5 attaches to the reflector 3. Then, the holder 6 is fixed to the attachment surface 3c of the reflector 3 using screws. The spring 7 is rotatably attached to the holder 6.

The discharge lamp bulb 4 is attached to the reflector 3. The flange 4b of the discharge lamp bulb 4 is inserted into the holding portion 3d, and the flange 4b surface closest to the light emitter 4a is made to contact the positioning stopper 3e. Then, both ends 7a of the spring 7 are latched to the latches 6b of the holder 6 while the spring 7 is made to contact the flange 4b, thereby pressing and fixing the discharge lamp bulb 4 to the reflector 3. Then, the lighting control circuit 8 is attached to the reflector 3. The female connector 8c of the lighting control circuit 8 is fitted to the male connector 4c of the discharge lamp bulb 4. Thereafter, the lighting control circuit 8 is fixed to the holder 6 using a screw through the attachment hole 8d. Finally, the cover 2c, for hermetically shielding the opening 2b, is attached to the lamp housing 2 to prevent water and foreign matter from entering the vehicle headlamp 1. This is one fashion in which the vehicle headlamp 1 may be assembled.

In the vehicle headlamp 1 according to this embodiment, the first opening 2d opens toward the space K defined by the rear surface 3f of the reflector 3 and the lamp housing 2, and is located lower than the lighting control circuit 8. Further, the second opening 2e opens toward (provides access to) the space K, and it is located higher than the lighting control circuit 8. The lamp housing 2 is constructed so that the space K is naturally ventilated through the first and second openings 2d, 2e. Thus, the lighting control circuit 8 can be cooled by an air stream, that is, the natural convection of air generated by a temperature difference of air between interior space K and that exterior to the housing 2 while the discharge lamp bulb 4 is lit. Therefore, the temperature of the lighting control circuit 8 can be prevented from increasing, and the thermal loads applied to the circuit elements can be reduced or at least maintained. Furthermore, the addition of a ventilation unit such as an electric fan is not required, thereby preventing production costs from increasing.

A labyrinth 10 is provided upstream of the first opening 2d, which is an inlet of outside air for the space K and for the lamp housing 2, to prevent water droplets and dust from entering the lamp housing 2. Although the labyrinth 10 is provided only for the first opening 2d in the above embodiment, the labyrinth 10 may be provided for both openings 2d and 2e, or simply just opening 2e.

Figure 3:
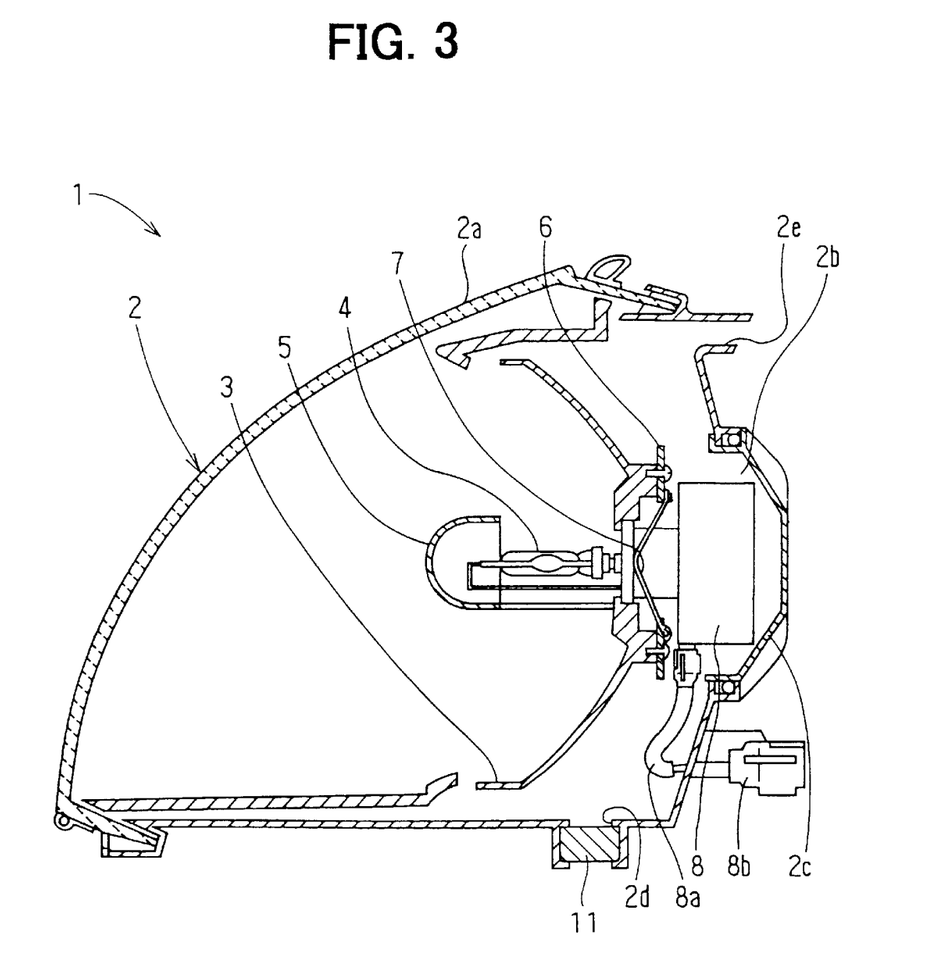
FIG. 3 is a cross-sectional view showing a vehicle headlamp according to a second embodiment of the present invention.

FIG. 3 is a cross-sectional view showing a vehicle headlamp 1 according to a second embodiment of the present invention. In the second embodiment, a filter 11 is provided in place of the labyrinth 10 as an inhibition member for preventing or inhibiting water, dust and other debris from entering into the lamp housing 2. In the embodiment shown, water droplets and dust can be inhibited from entering into the lamp housing 2 by the filter 11, and the same effects as in the first embodiment can be obtained by suitably setting the ventilation resistance of the filter 11. That is, various filters can be used to govern the flow of air into and through the space K. Filters with varying degrees of pass through can be utilized to obtain the desired air flow and debris restriction.

Figure 4:
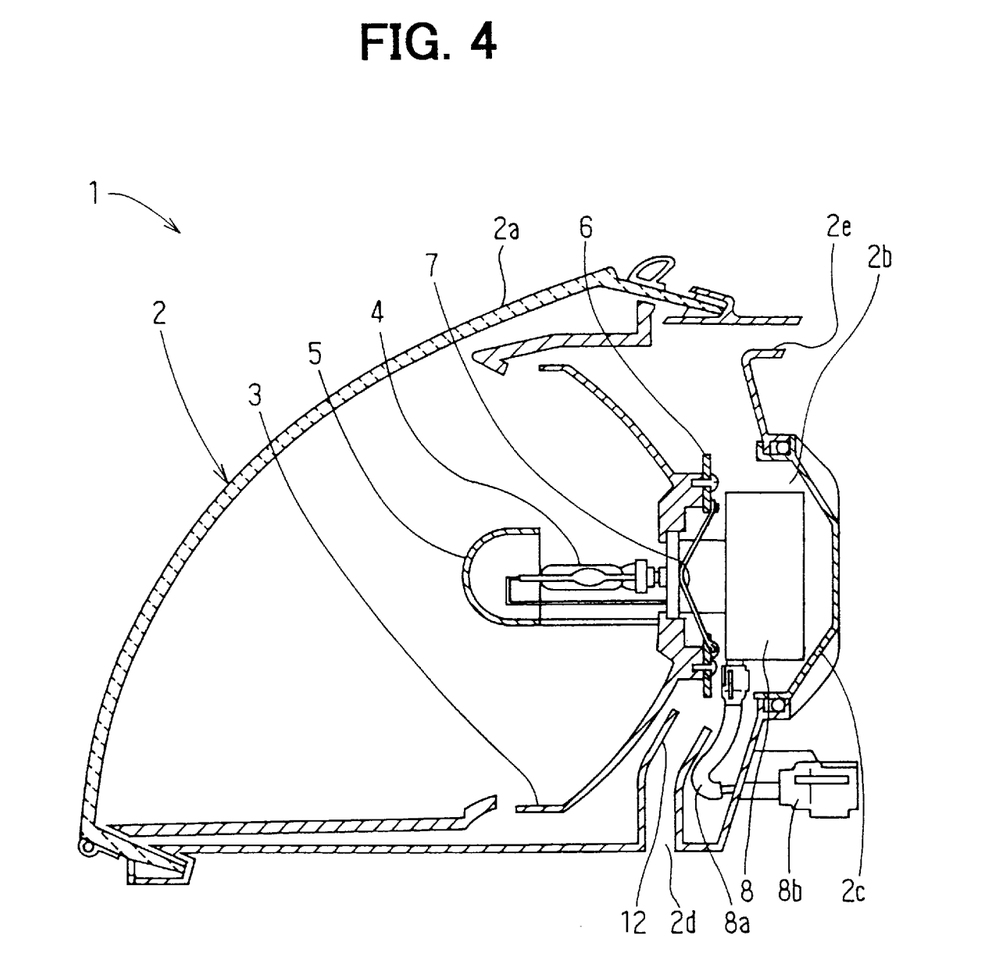
FIG. 4 is a cross-sectional view showing a vehicle headlamp according to a third embodiment of the present invention.

FIG. 4 is a cross-sectional view showing a vehicle headlamp 1 according to a third embodiment of the present invention. In the third embodiment, an extended passage 12 is provided at a downstream side of the first opening 2d. Therefore, low-temperature outside air is directly introduced around the lighting control circuit 8, thereby cooling the lighting control circuit 8, and reducing thermal loads applied to the circuit elements contained in the lighting control circuit 8.

Figure 5:
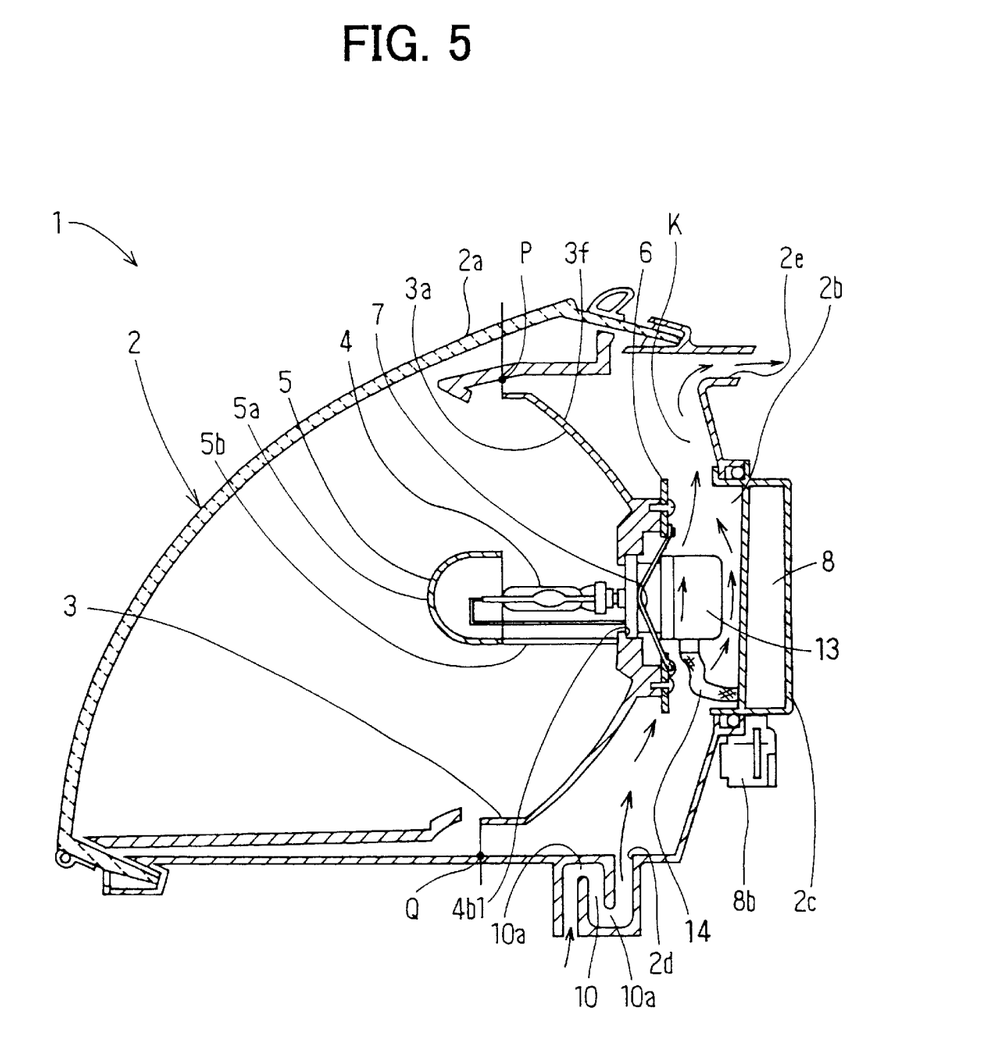
FIG. 5 is a cross-sectional view showing a vehicle headlamp according to a fourth embodiment of the present invention.

FIG. 5 is a cross-sectional view showing a vehicle headlamp 1 according to a fourth embodiment of the present invention. In the fourth embodiment, a lighting control circuit 8 including a converter, inverter and an igniter, is mounted on the cover 2c. A high-voltage harness 14, having a high-voltage connector 13, extends from the lighting control circuit 8 and into the high-voltage connector.

Figure 6:
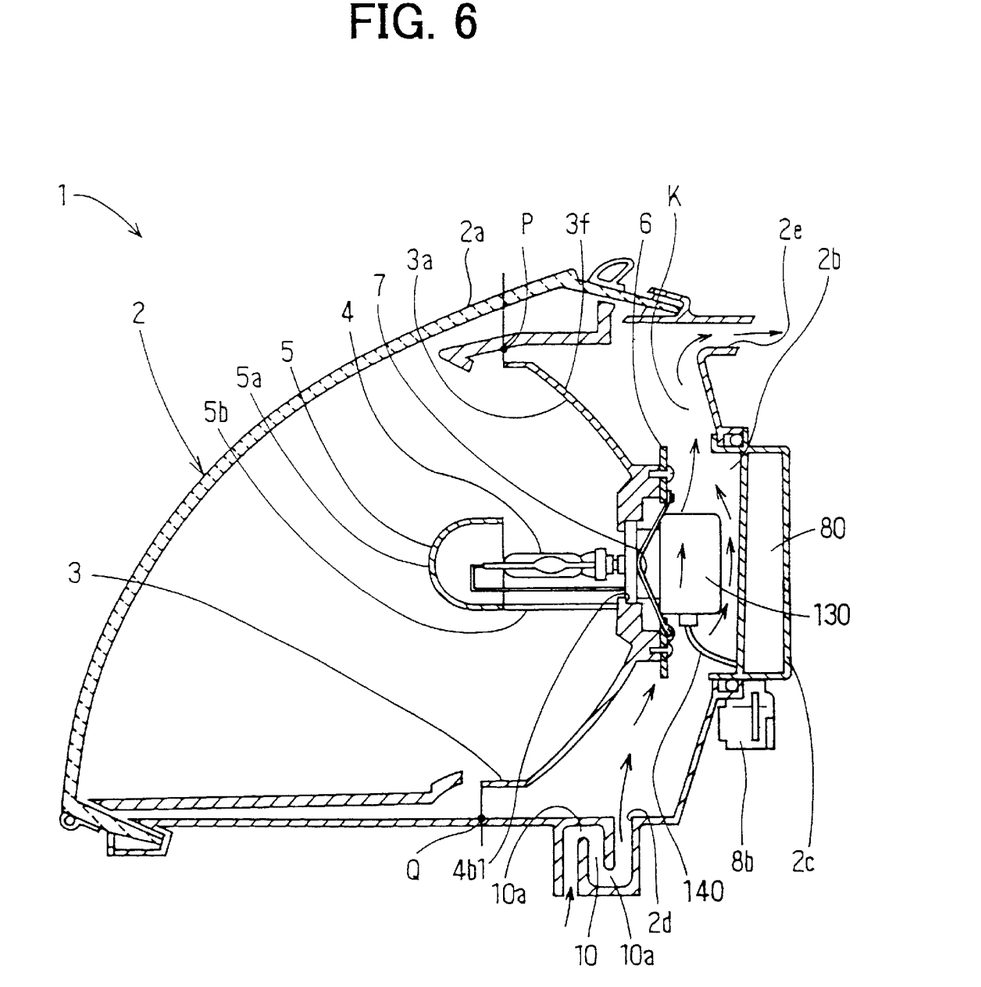
FIG. 6 is a cross-sectional view showing a vehicle headlamp according to a fifth embodiment of the present invention.

FIG. 6 is a cross-sectional view showing a vehicle headlamp 1 according to a fifth embodiment of the present invention. In the fifth embodiment, only an igniter is mounted at a side of the discharge lamp bulb 4, and a converter 80 is mounted on a case 2c. A lighting control circuit 130, constructed of an inverter, is an igniter integrated to the discharge lamp bulb 4 or an igniter contained in a high-voltage socket. A harness 140 leads from the lighting control circuit 130 to the converter 80.

While FIGS. 5 and 6 show a labyrinth 10 integrated into the lamp housing 2, a filter 11 and extended passage 12 could easily be used in place of the labyrinth 10 or in conjunction with the labyrinth 10 as a means to cool the lighting control circuit 8 and prevent debris from entering the space K.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle headlamp comprising:
   a discharge lamp bulb;
   a reflector for reflecting light emitted from the discharge lamp bulb;
   a lighting control circuit for energizing the discharge lamp bulb; and
   a lamp housing in which the discharge lamp bulb, the reflector and the lighting control circuit are contained, wherein:
   a rear surface of the reflector and the lamp housing define a space, in which the lighting control circuit is contained;
   the lamp housing includes a first opening, opening into the space, lower than the lighting control circuit, and a second opening, opening into the space, higher than the lighting control circuit; and
   the space is naturally ventilated by the first opening and the second opening.

2. The vehicle headlamp according to claim 1, wherein an inhibition member, for inhibiting water droplets and dust from entering into the space, is provided for either or both of the first opening and the second opening.

3. The vehicle headlamp according to claim 2, wherein the inhibition member is a filter for trapping water droplets and dust.

4. The vehicle headlamp according to claim 3, wherein the inhibition member is a labyrinth communicating with either or both of the first opening and the second opening.

5. A vehicle headlamp arrangement comprising:
   a discharge lamp bulb;
   a reflector for reflecting light emitted from the discharge lamp bulb;
   a lighting control circuit for energizing the discharge lamp bulb; and
   a lamp housing in which the discharge lamp bulb, the reflector and the lighting control circuit are contained, wherein:
   a rear surface of the reflector, the lamp housing, and a cover define a space, in which the lighting control circuit is contained;
   the lamp housing includes a first opening, opening into the space, lower than the lighting control circuit, and a second opening, higher than the lighting control circuit; and
   the first opening and the second opening provide ventilation to the space so that the lighting control circuit can maintain a constant temperature.

6. The vehicle headlamp arrangement according to claim 5, wherein the lighting control circuit is mounted to the cover.

7. The vehicle headlamp arrangement according to claim 6, wherein the lighting control circuit further comprises a converter, an inverter, and an igniter connected by a high voltage harness to a high voltage connector mounted on the rear of the discharge lamp bulb.

8. The vehicle headlamp arrangement according to claim 7, wherein airflow from the first opening flows between the lighting control circuit and the high voltage connector to the second opening.

9. The vehicle headlamp arrangement according to claim 5, wherein a converter is mounted to the cover.

10. The vehicle headlamp arrangement according to claim 9, wherein the lighting control circuit further comprises an inverter and an igniter, the lighting control circuit mounted to the rear of the discharge lamp bulb.

11. The vehicle headlamp arrangement according to claim 10, wherein airflow from the first opening flows between the lighting control circuit and the converter to the second opening.

12. The vehicle headlamp arrangement according to claim 11, wherein the opening is preceded by a labyrinth to direct airflow to prevent water droplets and other debris from entering the headlamp.

13. The vehicle headlamp arrangement according to claim 11, wherein the opening is preceded by a filter to prevent water droplets and other debris from entering the headlamp.

* * * * *